United States Patent Office 3,197,442
Patented July 27, 1965

3,197,442
POLYAMIDE RESINS FROM DIALKALI METAL DIPYRIDYL COMPOUNDS
Walter E. Kramer, Niles, and Louis A. Joo, Crystal Lake, Ill., assignors to The Pure Oil Company, Chicago, Ill., a corporation of Ohio
No Drawing. Filed Dec. 20, 1960, Ser. No. 77,015
5 Claims. (Cl. 260—78)

This invention relates to new and useful nitrogen-containing polymers derived from metal amides produced by reaction of an alkali metal with a heterocyclic aromatic amine such as pyridine, quinoline, acridine, etc.

During the period from 1914 to about 1921, there were reported in the literature the results of experimental work by Bruno Emmert on the reactions of pyridine with the alkali metals. Typical reports of this work are found in Berichte, 47, 2598 (1914); 49, 1060 (1916); 50, 31 (1917); 52, 1351 (1919); 53, 370 (1920); and 54, 204 (1921). In these publications, Emmert reported that sodium will react with pyridine to produce a disodiumdipyridyl compound. Emmert also reported the formation of similar compounds by reaction of sodium with other aromatic heterocyclic amines, such as quinoline, acridine, and the like. In the co-pending application of Walter E. Kramer, Louis A. Joo, and Robert M. Haines, Serial No. 28,866, filed May 13, 1960, now Patent No. 3,147,262, a process is described in which a variety of dialkali metal amides are formed by reaction of alkali metals with aromatic heterocyclic amines, which compounds are converted to dibasic acid salts by reaction with carbon dioxide.

This invention is concerned with the preparation of polyamide resins from the alkali metal dipyridyl compounds and their analogs which are described in the aforementioned co-pending patent application of Kramer et al.

One of the objects of this invention is the provision of a novel process for the preparation of novel polymers from aromatic heterocyclic amines.

Another object of this invention is the provision of a novel class of resinous polymers derived from aromatic heterocyclic amines.

A feature of this invention is the provision of a process in which metal amides prepared by reaction of alkali metals with aromatic heterocyclic amines are reacted with acyl halides to produce a novel class of acid amides.

Another feature of this invention is the provision of a novel process for the preparation of nitrogen-containing polymers by reaction of an unsaturated acyl halide with a metal amide prepared by reaction of an alkali metal with an aromatic heterocyclic amine, followed by polymerization of the unsaturated intermediate.

Another feature of this invention is the provision of a novel process for preparation of polyacid polyamides by reaction of metal amides, prepared by reaction of alkali metals with aromatic heterocyclic amines, with diacyl halides.

Another feature of this invention is the provision of a novel class of acid amides produced by reaction of alkali metal diamides of aromatic heterocyclic amines with acyl halides in an inert solvent at 0° to +100° C.

Another feature of this invention is the provision of a novel class of polyamide resins produced by polymerization of unsaturated diacid diamides.

Still another feature of this invention is the provision of a novel class of polyacid polyamides produced by reaction of an alkali metal diamide of an aromatic heterocyclic amine with a diacyl halide in an inert solvent at 0° +100° C.

Other objects and features of this invention will become apparent from time to time throughout the specification and claims as hereinafter related.

This invention is based upon the discovery that compounds of the type described by Emmert and described in the aforementioned co-pending patent application of Kramer et al. can be utilized in the preparation of novel diacid diamides and polyacid polyamide resins. In our invention, alkali metals, such as sodium, potassium, lithium, etc., and mixtures thereof, such as sodium-potassium alloys, are reacted with heterocyclic aromatic amines, such as pyridine, quinoline, acridine, and the like, to form intermediate diamides of the formula:

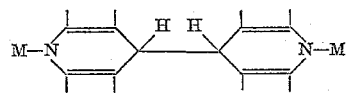

where M is an alkali metal, and the nitrogen-containing nuclei are derived from a heterocyclic aromatic amine.

The intermediate diamide which is formed is reacted in suspension in any inert liquid or in solution in an inert solvent (preferably a high boiling polar solvent, e.g. glycols, Carbitols, Cellosolves, etc.) at a temperature in the range from about 0° to +100° C. with an acyl halide. The acyl halide reactant may be a saturated or unsaturated, aliphatic, cycloaliphatic, or aromatic mono- or diacyl halide. In this reaction an alkali metal halide precipitates as a by-product and is filtered off. There remains in solution the product acyl amide. Where monoacyl halide is used as a reactant, the product obtained is a diacid diamide in accordance with the following reaction:

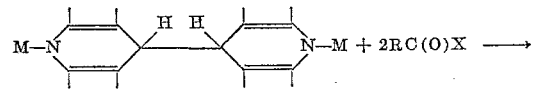

Where R is a saturated aliphatic, cycloaliphatic or aromatic radical, the product amide is usually liquid and is useful as a plasticizer. Where R is an unsaturated hydrocarbon radical containing polymerizable olefinic bonds, the product diacid diamide can be polymerized to produce polyamide resins which are useful as encapsulating and potting resins. When the acyl halide reactant is a diacyl halide, the product obtained is a polyamide in accordance with the folowing reaction:

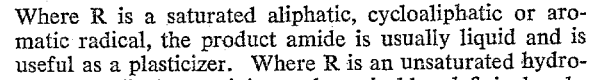

where $m$ is an integer. In this reaction, a very slight stoichiometric excess of the acyl halide is used to insure that the polymer chains terminate in halogens rather than reactive alkali-metal atoms. In most cases, the product amide remains in solution so that the by-product metal halide is separated by filtration. However, where the polymer is precipitated from the solution along with the by-product alkali metal halide, the product can be purified by water washing. The polyacyl polyamides prepared using diacyl halides are useful as structural resins which can be cast or molded.

In preparing the novel compounds of this invention, a dispersion of an alkali metal, such as sodium, lithium, potassium, or sodium-potassium alloys, is formed in an inert solvent. The solvent or reaction medium used is preferably a mineral oil, such as a white oil, although other inert solvents can be used, such as hydrogenated aromatic extracts of mineral oils, xylene, and ethers and acetals, such as diethyl ether, dipropyl ether, dioctyl ether, dimethoxyethane, methylal, dimethyl ether of diethylene glycol, etc. When liquid sodium-potassium alloys are used, a mixed sodium-potassium product is obtained and the solvent may be eliminated. The dispersion of the alkali metal in the inert solvent is then added to an aromatic heterocyclic amine, such as pyridine, quinoline, acridine, or derivatives thereof containing only inert substituents, e.g., picoline, lutidine, esters or salts of nicotinic acid, 2-benzylpyridine, 2,3,6-collidine, etc., while maintaining the reaction at about $+25°$ to $+100°$ C. Under these conditions, the alkali metal reacts with the aromatic heterocyclic amine, i.e., adds at the nitrogen atom, with the result that the aromatic amine dimerizes and there is formed a dialkali-metal amide of the aromatic amine dimer. In the case of pyridine and sodium, the reaction is as follows:

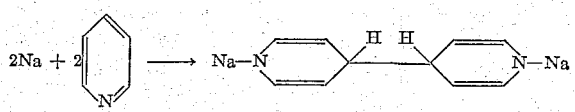

Since this reaction is one which takes place with all of the aromatic heterocyclic amines, we report the general reaction as follows:

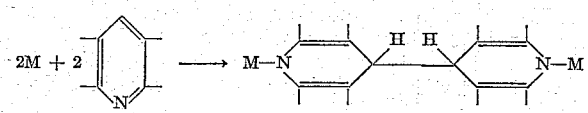

Where M is an alkali metal, and

represents the nucleus of an aromatic heterocyclic amine. After the intermediate alkali-metal diamide of the aromatic amine is formed, it is reacted in suspension or solution with a mono- or diacyl halide, as above described. In carrying out this reaction, any inert solvent may be used which is unreactive toward the reactants and which has physical properties which make it generally suitable as a reaction medium. Any of the liquids used in the preparation of the intermediate diamide may be used in the reaction which produces the product diacyl amides or polyamide resins. The acyl halides used in the reaction have the general formula:

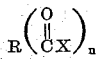

where X is halogen (e.g., I, F, Cl, or Br), n is 1 or 2, and R is a hydrocarbon radical (preferably $C_1$-$C_{20}$) free of double bonds which would cause polymerization under the reaction conditions used. In the acyl halide, the hydrocarbon radical R can be aliphatic, cycloaliphatic, or aromatic, and can contain hydrocarbon side-chains. R may be unsaturated as long as the unsaturated bonds are of a type which are not readily polymerized under the reaction conditions used. The types of compounds which are excluded are ones which contain diolefin bonds and similar compounds which are readily polymerized by alkali metals. Compounds which can be used and which are illustrative of the scope of this invention include:

Aliphatic mono-acyl halides such as
$CH_3C(O)Cl$, $C_2H_5C(O)Br$, $C_3H_7C(O)I$, $C_8H_{17}C(O)Cl$
$C_{11}H_{23}C(O)Cl$, $C_{16}H_{39}C(O)Cl$, $CH_2{:}CHC(O)Cl$
$CH_3CH{:}CHC(O)Cl$, $C_{10}H_{21}CH{:}CHC(O)Cl$
$CH{:}C \cdot C(O)Cl$, $CH_3C{:}C{-}C(O)Cl$ Aromatic mono-acyl halides such as

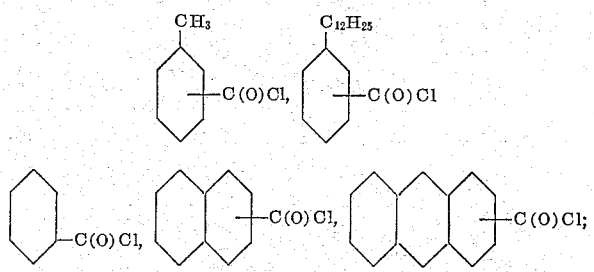

Cycloaliphatic acyl halides such as

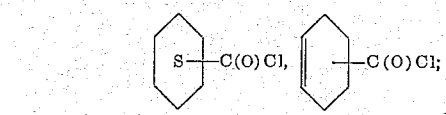

Aliphatic diacyl halides such as
$Cl(O)CCH_2C(O)Cl$, $Cl(O)CCH_2CH_2C(O)Cl$
$Cl(O)CCH_2CH_2CH_2CH_2C(O)Cl$
$Cl(O)CCH_2CH{=}CHCH_2C(O)Cl$
$Cl(O)CCH_2CHCH_2C(O)Cl$ and aromatic diacyl halides such as

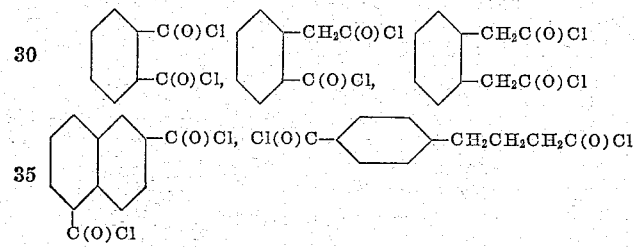

The following illustrative examples are illustrative of this invention:

*Example 1*

A sodium dispersion is prepared by heating two mols of sodium and 500 g. of xylene above the melting point of sodium with agitation. The dispersion is then cooled to $+40°$ C., and 300 ml. of pyridine are added, whereupon the solution turns first yellow, then black. The mixture is maintained at $+45°$ C., and after about 3–6 hours, two mols of acetyl chloride are added dropwise, with agitation. After all of the acetyl chloride has been added, the mixture is stirred for an additional four-hour period to assure completion of reaction. The mixture is then cooled to room temperature and filtered to remove by-product sodium chloride. Thereafter, the solvent is stripped from the filtrate to yield a diamide of the formula:

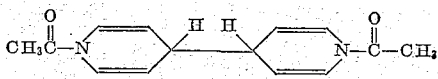

in substantially pure form as product. This diamide is a liquid at room temperature and is useful as a plasticizer.

*Example 2*

A sodium dispersion is prepared by heating two mols of sodium and 500 g. of xylene above the melting point of sodium with agitation. The dispersion is then cooled to $+40°$ C., and 300 ml. of pyridnie are added, whereupon the solution changes color. Next, the mixture is warmed and maintained at 45° C. After about 3–6 hours, two mols of lauryl chloride are added dropwise, with agitation. After all of the lauryl chloride has been added, the mixture is stirred for an additional four-hour period to assure completion of reaction. The mixture is then cooled to room temperature and filtered to remove by-product sodium chloride. Thereafter, the solvent is stripped from the filtrate to yield a diamide of the formula:

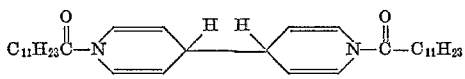

in substantially pure form as product. This diamide is a liquid at room temperature and is useful as a plasticizer.

Example 3

A sodium dispersion is prepared by heating two mols of sodium and 500 g. of xylene above the melting point of sodium, with agitation. The dispersion is then cooled to +40° C., and 300 ml. of pyridine are added, whereupon the solution turns first yellow, then black. The mixture is maintained at +45° C., and after about 3–6 hours, two mols of benzoyl chloride are added dropwise, with agitation. After all of the benzoyl chloride has been added, the mixture is stirred for an additional four-hour period to assure completion of reaction. The mixture is then cooled to room temperature and filtered to remove by-product sodium chloride. Thereafter, the solvent is stripped from the filtrate to yield a diamide of the formula:

in substantially pure form as product. This diamide is a liquid at room temperature and is useful as a plasticizer.

Example 4

A sodium dispersion is prepared by heating two mols of sodium and 500 g. of xylene above the melting point of sodium, with agitation. The dispersion is then cooled to +40° C., and 300 ml. of pyridine are added, whereupon the solution turns first yellow, then black. The mixture is maintained at +45° C., and after about 3–6 hours, two mols of acrylyl chloride are added dropwise, with agitation. After all of the acrylyl chloride has been added, the mixture is stirred for an additional four-hour period to assure completion of reaction. The mixture is then cooled to room temperature and filtered to remove by-product sodium chloride. Thereafter, the solvent is stripped from the filtrate to yield a diamide of the formula:

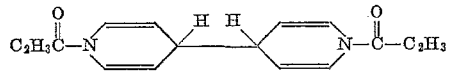

in substantially pure form as product. This diamide is a liquid which can be polymerized in solution, or as an emulsion, by addition of a small quantity of a polymerization initiator, preferably a peroxide such as benzoyl peroxide. When this unsaturated amide is polymerized, the product obtained is a solid resin which is useful as a coating material and also as a casting or molding resin.

Example 5

When the procedure of Example 1 is repeated using other alkali metals, a similar alkali metal amide intermediate is obtained. Thus, when potassium, lithium, or mixtures of alkali metals such as the liquid sodium-potassium alloys, are dispersed in an inert liquid, the dialkali metal diamide is formed upon addition of pyridine. The dialkali metal diamide reacts with the acyl halides in solution in the same manner regardless of whether sodium, potassium, lithium, or mixtures are used in the preparation of the metal amide.

Example 6

A sodium dispersion is prepared by heating two mols (45 g.) of sodium and 500 g. of xylene above the melting point of sodium with agitation. The dispersion is then cooled to +40° C., and 500 ml. of quinoline are added, whereupon the solution turns first yellow, then black. The mixture is maintained at 100° C., and after about 3–6 hours, the reaction mixture is cooled to room temperature and two mols of acetyl chloride are added dropwise. After all of the acetyl chloride has been added, the mixture is stirred for an additional four-hour period to assure completion of reaction. The reaction mixture is then filtered to remove by-product sodium chloride. Thereafter the solvent is stripped from the filtrate to leave a diamide of the formula:

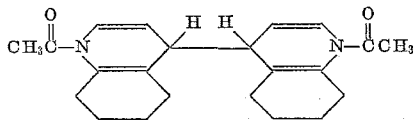

in substantially pure form as the product. This diamide is useful as a plasticizer.

Example 7

A sodium dispersion is prepared by heating two mols (45 g.) of sodium and 500 g. of xylene above the melting point of sodium with agitation. The dispersion is then cooled to +40° C., and 500 ml. of acridine are added, whereupon the solution turns first yellow, then black. The mixture is maintained at +100° C., and after about 3–6 hours, the reaction mixture is cooled to room temperature and two mols of acetyl chloride are added dropwise. After all of the acetyl chloride has been added, the mixture is stirred for an additional four-hour period to assure completion of reaction. The reaction mixture is then filtered to remove by-product sodium chloride. Thereafter the solvent is stripped from the filtrate to give a diamide of the formula:

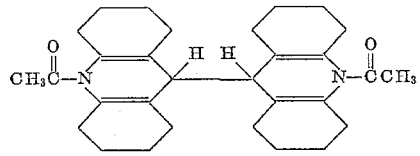

in substantially pure form as product. This diamide is useful as an organic intermediate.

Example 8

A sodium dispersion is prepared by heating two mols (45 g.) of sodium and 500 g. of xylene above the melting point of sodium with agitation. The dispersion is then cooled to +40° C., and 500 ml. of 2,6-lutidine are added, whereupon the solution turns first yellow, then black. The mixture is maintained at 45° C., and after about 3–6 hours, the reaction mixture is cooled to room temperature and two mols of acetyl chloride are added dropwise. After all of the acetyl chloride has been added, the mixture is stirred for an additional four-hour period to assure completion of reaction. The reaction mixture is then filtered to remove by-product sodium chloride. Thereafter the solvent is stripped from the filtrate to leave a diamide of the formula:

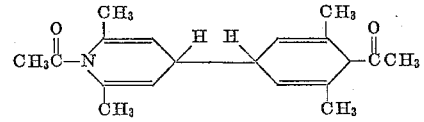

in substantially pure form as the product. This diamide is useful as an organic intermediate.

Example 9

A sodium dispersion is prepared by heating two mols (45 g.) of sodium and 500 g. of xylene above the melting point of sodium with agitation. The dispersion is then cooled to 40° C., and 500 ml. of picoline are added, whereupon the solution turns first yellow, then black. The mixture is maintained at 90° C., and after about 1–4 hours, the reaction mixture is cooled to room temperature and two mols of acetyl chloride are added dropwise. After all of the acetyl chloride has been added, the mixture is stirred for an additional four-hour period to assure completion of reaction. The reaction mixture is then filtered to remove by-product sodium chloride. Thereafter, the solvent is stripped from the filtrate to leave a diamide of the formula:

$$CH_3\overset{O}{\overset{\|}{C}}-N\underset{CH_3}{\overset{}{\diagdown}}\!\!\!\overbrace{\phantom{xx}}\!\!\!-\!\!\overset{H}{C}\!\overset{H}{C}\!-\!\!\overbrace{\phantom{xx}}\!\!\!\underset{CH_3}{\overset{}{\diagdown}}\!\!\!N-\overset{O}{\overset{\|}{C}}CH_3$$

in substantially pure form as the product. This diamide is useful as a plasticizer.

*Example 10*

A sodium dispersion is prepared by heating two mols (45 g.) of sodium and 500 g. of xylene above the melting point of sodium with agitation. The dispersion is then cooled to +40° C., and 300 ml. of pyridine are added, whereupon the solution turns first yellow, then black. The mixture is maintained at 90° C., and after about 1–4 hours, the reaction mixture is cooled to room temperature and one mol of malonyl chloride is added dropwise. After all of the dihalide has been added, the mixture is stirred for an additional four-hour period to assure completion of reaction. The reaction mixture is filtered to remove by-product sodium chloride. The filtrate is then evaporated and a solid resin polymer is recovered. The polymer which is obtained in this reaction has the general formula:

$$ClC\overset{O}{\overset{\|}{C}}CH_2\overset{O}{\overset{\|}{C}}-[-N\!\!\overbrace{\phantom{xx}}\!\!-\!\!\overset{H}{C}\!\overset{H}{C}\!-\!\!\overbrace{\phantom{xx}}\!\!N-\overset{O}{\overset{\|}{C}}CH_2\overset{O}{\overset{\|}{C}}-]_m Cl$$

where $m$ is an integer, and is useful as a molding resin, as an ingredient of coating compositions, and an ion-exchange resin.

*Example 11*

A sodium dispersion is prepared by heating two mols (45 g.) of sodium and 500 g. of xylene above the melting point of sodium with agitation. The dispersion is then cooled to +40° C., and 300 ml. of pyridine are added, whereupon the solution turns first yellow, then black. The mixture is maintained at 90° C., and after about 1–4 hours, the mixture is cooled to room temperature and one mol of adipyl chloride is added dropwise. After all of th edihalide has been added the mixture is stirred for an additional four-hour period to assure completion of reaction. The reaction mixture is then filtered to remove by-product sodium chloride. The filtrate is then evaporated and a solid resin polymer is recovered. The polymer which is obtained in this reaction has the general formula:

$$ClC\overset{O}{\overset{\|}{C}}-CH_2CH_2CH_2CH_2\overset{O}{\overset{\|}{C}}-[-N\!\!\overbrace{\phantom{xx}}\!\!-\!\!\overset{H}{C}\!\overset{H}{C}\!-\!\!\overbrace{\phantom{xx}}\!\!N-\overset{O}{\overset{\|}{C}}-CH_2CH_2CH_2CH_2\overset{O}{\overset{\|}{C}}-]_m Cl$$

where $m$ is an integer, and is useful as a molding resin, as an ingredient of coating compositions, and an ion-exchange resin.

*Example 12*

A sodium dispersion is prepared by heating two mols (45 g.) of sodium and 500 g. of xylene above the melting point of sodium with agitation. The dispersion is then cooled to +40° C., and 300 ml. of pyridine are added, whereupon the solution turns first yellow, then black. The mixture is maintained at 90° C., and after about 1–4 hours, the reaction mixture is cooled to room temperature and one mol of sebacyl chloride is added dropwise. After all of the dihalide has been added, the mixture is stirred for an additional four-hour period to assure completion of reaction. The reaction mixture is then filtered to remove by-product sodium chloride. The filtrate is then evaporated and a solid resin polymer is re-covered. The polymer which is obtained in this reaction has the general formula:

$$Cl\overset{O}{\overset{\|}{C}}(CH_2)_8\overset{O}{\overset{\|}{C}}-[-N\!\!\overbrace{\phantom{xx}}\!\!-\!\!\overset{H}{C}\!\overset{H}{C}\!-\!\!\overbrace{\phantom{xx}}\!\!N-\overset{O}{\overset{\|}{C}}(CH_2)_8\overset{O}{\overset{\|}{C}}]_m Cl$$

where $m$ is an integer, and is useful as a molding resin, as an ingredient of coating compositions, and an ion-exchange resin.

*Example 13*

A sodium dispersion is prepared by heating two mols (45 g.) of sodium and 500 g. of xylene above the melting point of sodium with agitation. The dispersion is then cooled to +40° C., and 300 ml. of pyridine are added, whereupon the solution turns first yellow then black. The mixture is maintained at 90° C., and after about 1–4 hours, the reaction mixture is cooled to room temperature and one mol of phthalyl chloride is added dropwise. After all of the dihalide has been added, the mixture is stirred for an additional four-hour period to assure completion of reaction. The reaction mixture is then filtered to remove by-product sodium chloride. The filtrate is then evaporated and a solid resin polymer is recovered. The polymer which is obtained in this reaction has the general formula:

$$\underset{\bigcirc}{\overset{O}{\overset{\|}{C}}\overset{O}{\overset{\|}{C}}}-[-N\!\!\overbrace{\phantom{xx}}\!\!-\!\!\overset{H}{C}\!\overset{H}{C}\!-\!\!\overbrace{\phantom{xx}}\!\!N-\overset{O}{\overset{\|}{C}}\overset{O}{\overset{\|}{C}}-\underset{\bigcirc}{}]_m Cl$$

where $m$ is an integer, and is useful as a molding resin, as an ingredient of coating compositions, and an ion-exchange resin.

While we have described our invention fully and completely with special emphasis upon several preferred embodiments thereof, we wish it to be understood that other reactants within the general classes of reactants set forth above may be utilized in our process for the preparation of the novel nitrogen-containing resins which we have discovered. We therefore wish it to be understood that, within the scope of the appended claims, this invention may be practiced otherwise than as specifically described herein.

The embodiments of the invention in which an exclusive property or privilege is claimed are defined as follows:

1. The method of producing resinous polyamides of the formula $$X\overset{O}{\overset{\|}{C}}R\overset{O}{\overset{\|}{C}}-\left[-N\!\!\overbrace{\phantom{xx}}\!\!-\!\!\overset{H}{C}\!\overset{H}{C}\!-\!\!\overbrace{\phantom{xx}}\!\!N-\overset{O}{\overset{\|}{C}}R\overset{O}{\overset{\|}{C}}\right]_m X$$

comprising reacting an acyl halide of the formula $$R\!\left(\overset{O}{\overset{\|}{C}}X\right)_{\!2}$$

with a metal amide of the formula $$M-N\!\!\overbrace{\phantom{xx}}\!\!-\!\!\overset{H}{C}\!\overset{H}{C}\!-\!\!\overbrace{\phantom{xx}}\!\!N-M$$

in which
X is halogen,
R is a hydrocarbon radical free of diolefin bonds readily polymerized by alkali metals and selected from the group of $C_1$–$C_{20}$ saturated and unsaturated aliphatic and cycloaliphatic radicals and aromatic radicals,
M is an alkali metal,
$m$ is an integer, and the nuclei

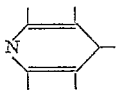

are formed from a cyclic tertiary monoamine of the same molecular formula, containing no constituents, other than the tertiary N atom, which are not inert toward alkali metals under reaction conditions.

2. A resinous polyamide of the formula

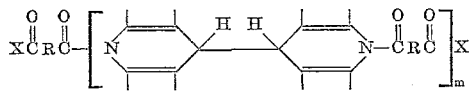

in which R is selected from the group consisting of $C_1$–$C_{20}$ saturated and unsaturated aliphatic and cycloaliphatic radicals and aromatic radicals, X is halogen, $m$ is an integer, and the nuclei

are formed from a cyclic tertiary mono-amine of the same molecular formula, containing no constituents, other than the tertiary N atom, which are not inert toward alkali metals.

3. A method of preparing resinous polyamides which comprises reacting malonyl chloride with:

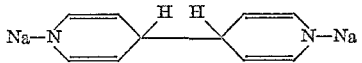

in an inert liquid at 0° to 100° C., filtering out by-product sodium chloride, and evaporating the liquid reaction medium to recover the product polyamide.

4. A method of preparing resinous polyamides which comprises reacting adipyl chloride with:

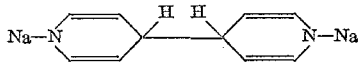

in an inert liquid at 0° to 100° C., filtering out by-product sodium chloride, and evaporating the liquid reaction medium to recover the product polyamide.

5. A method of preparing resinous polyamides which comprises reacting sebacyl chloride with:

in an inert liquid at 0° to 100° C., filtering out by-product sodium chloride, and evaporating the liquid reaction medium to recover the product polyamide.

References Cited by the Examiner
UNITED STATES PATENTS

| | | | |
|---|---|---|---|
| 2,304,830 | 12/42 | Katzman | 260—295 |
| 2,726,244 | 12/55 | Sobotka | 260—295 |
| 2,904,536 | 9/59 | Reith | 260—78 |
| 2,952,667 | 9/60 | Caldwell | 260—78 |

WILLIAM H. SHORT, *Primary Examiner.*

MILTON STERMAN, LOUISE P. QUAST, *Examiners.*

UNITED STATES PATENT OFFICE
CERTIFICATE OF CORRECTION

Patent No. 3,197,442                        July 27, 1965

Walter E. Kramer et al.

It is hereby certified that error appears in the above numbered patent requiring correction and that the said Letters Patent should read as corrected below.

Column 1, line 68, for "0° +100° C." read -- 0° to +100° C. --; column 2, lines 48 to 55, for that portion of the formula reading $$-[_m X \quad\quad \text{read} \quad\quad -]_m X$$

column 4, after line 22 insert the following $$Cl(O)CCH_2CH_2CH_2C(O)Cl$$

line 26, the formula should appear as shown below instead of as in the patent:

$$Cl(O)CCH_2\underset{\underset{C_2H_5}{|}}{C}HCH_2C(O)Cl$$

column 8, lines 28 to 33, for the left-hand portion of the formula reading

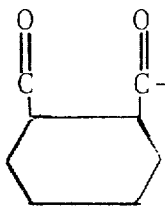      read      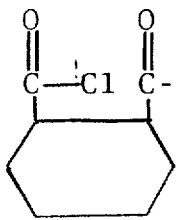

Signed and sealed this 17th day of May 1966.

)
t:

T W. SWIDER                                  EDWARD J. BRENNER
ting Officer                                    Commissioner of Patents